(12) United States Patent
Korber

(10) Patent No.: US 10,549,703 B2
(45) Date of Patent: Feb. 4, 2020

(54) FASTENING CLAW

(71) Applicant: Bayerische Motoren Werke Aktiengesellschaft, Munich (DE)

(72) Inventor: Franz Korber, Mallersdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 396 days.

(21) Appl. No.: 14/990,896

(22) Filed: Jan. 8, 2016

(65) Prior Publication Data

US 2016/0114739 A1    Apr. 28, 2016

Related U.S. Application Data

(63) Continuation of application No. PCT/EP2014/067379, filed on Aug. 14, 2014.

(30) Foreign Application Priority Data

Sep. 18, 2013   (DE) .................. 10 2013 218 650

(51) Int. Cl.
*B60R 13/00* (2006.01)
*F16B 2/22* (2006.01)
*F16B 2/24* (2006.01)

(52) U.S. Cl.
CPC ............... *B60R 13/00* (2013.01); *F16B 2/22* (2013.01); *F16B 2/245* (2013.01)

(58) Field of Classification Search
CPC .. F16B 2/22; F16B 2/45; F16B 21/073; F16B 21/075; F16B 21/186; F16B 43/004; F16B 5/0642; F16B 5/0664; F16B 21/20; F16B 21/16; F16B 37/02; Y10T 24/45099;
(Continued)

(56) References Cited

U.S. PATENT DOCUMENTS

| | | | |
|---|---|---|---|
| 1,059,420 A * | 4/1913 | Worth | F16B 39/14 411/247 |
| 2,266,049 A | 12/1941 | Kost | |

(Continued)

FOREIGN PATENT DOCUMENTS

| | | |
|---|---|---|
| CN | 102785597 A | 11/2012 |
| DE | 36 00 311 A1 | 9/1986 |

(Continued)

OTHER PUBLICATIONS

Chinese Office Action issued in counterpart Chinese Application No. 201480040767.5 dated Sep. 1, 2016 with English translation (17 pages).

(Continued)

*Primary Examiner* — Victor D Batson
*Assistant Examiner* — Matthew J Sullivan
(74) *Attorney, Agent, or Firm* — Crowell & Moring LLP

(57) ABSTRACT

A fastening claw has an annular section with a radial inner side, from which at least two flexible, tongue-type elements project inwards and obliquely upwards towards an upper side of the fastening claw. The tongue-type elements have free ends which define a central, open region of the fastening claw, into which region a securing element can be introduced from the underside of the fastening claw and can be clamped between the free ends of the tongue-type elements.

35 Claims, 9 Drawing Sheets

(58) Field of Classification Search
CPC ......... Y10T 24/45105; Y10T 24/45251; Y10T 24/45262; Y10T 24/45995
See application file for complete search history.

(56) References Cited

U.S. PATENT DOCUMENTS

| | | | | |
|---|---|---|---|---|
| 4,190,763 | A * | 2/1980 | Seibel | B60N 3/14 219/264 |
| 4,390,210 | A | 6/1983 | Wisniewski et al. | |
| 5,112,178 | A * | 5/1992 | Overhues | F16B 39/24 267/161 |
| 5,707,193 | A | 1/1998 | Hasegawa | |
| 6,082,943 | A | 7/2000 | Schneider | |
| 6,705,813 | B2 * | 3/2004 | Schwab | F16B 21/20 411/156 |
| D528,407 | S * | 9/2006 | Schwab | D8/399 |
| D703,034 | S * | 4/2014 | Stewart | D8/399 |
| 8,776,326 | B2 * | 7/2014 | Clarke | B60R 13/0206 24/297 |
| 2011/0173797 | A1 | 7/2011 | van Niekerk et al. | |
| 2011/0258820 | A1 | 10/2011 | Komsitsky et al. | |
| 2013/0031756 | A1 * | 2/2013 | Yuen | F16B 5/0642 24/702 |
| 2013/0071181 | A1 | 3/2013 | Herzinger et al. | |
| 2013/0071205 | A1 * | 3/2013 | Kuehn | F16B 21/20 411/511 |
| 2013/0125372 | A1 | 5/2013 | van Niekerk et al. | |
| 2013/0185916 | A1 | 7/2013 | Mantei et al. | |
| 2013/0212858 | A1 | 8/2013 | Herzinger et al. | |
| 2013/0269873 | A1 | 10/2013 | Herzinger et al. | |
| 2014/0294488 | A1 | 10/2014 | Van Niekerk et al. | |
| 2015/0033532 | A1 | 2/2015 | van Niekerk et al. | |
| 2017/0097026 | A1 * | 4/2017 | Korber | F16B 5/0642 |

FOREIGN PATENT DOCUMENTS

| | | | | |
|---|---|---|---|---|
| DE | 196 15 130 A1 | 10/1997 | | |
| DE | 10 2008 038 747 A1 | 2/2010 | | |
| DE | 10 2009 049 602 B3 | 7/2011 | | |
| DE | 10 2010 028 322 A1 | 11/2011 | | |
| DE | 10 2010 028 323 A1 | 11/2011 | | |
| DE | 10 2010 030 964 A1 | 1/2012 | | |
| DE | 10 2010 041 356 A1 | 3/2012 | | |
| DE | WO 2012/031652 A1 | 3/2012 | | |
| DE | 10 2010 042 803 A1 | 4/2012 | | |
| DE | 10 2010 063 717 A1 | 6/2012 | | |
| DE | 10 2011 018 525 A1 | 10/2012 | | |
| DE | 10 2012 206 938 B3 | 2/2013 | | |
| DE | 10 2011 053 786 A1 | 3/2013 | | |
| DE | 10 2012 203 217 A1 | 9/2013 | | |
| EP | 0 886 074 A1 | 12/1998 | | |
| EP | 1 101 957 A2 | 5/2001 | | |
| EP | 2698549 A1 * | 2/2014 | | F16B 5/0642 |
| GB | 566446 | 12/1944 | | |
| GB | 1036103 | 7/1966 | | |
| WO | WO 95/20108 A1 | 7/1995 | | |
| WO | WO 2012/142369 A1 | 10/2012 | | |

OTHER PUBLICATIONS

Chinese Office Action issued in counterpart Chinese Application No. 201480040767.5 dated Mar. 20, 2017 with English translation (13 pages).
International Search Report (PCT/ISA/210) issued in PCT Application No. PCT/EP2014/067379 dated Dec. 2, 2014, with English translation (eight (8) pages).
German Office Action issued in counterpart German Application No. 10 2013 218 650.9 dated May 28, 2014 (eight (8) pages).

* cited by examiner

FASTENING CLAW

CROSS REFERENCE TO RELATED APPLICATIONS

This application is a continuation of PCT International Application No. PCT/EP2014/067379, filed Aug. 14, 2014, which claims priority under 35 U.S.C. § 119 from German Patent Application No. 10 2013 218 650.9, filed Sep. 18, 2013, the entire disclosures of which are herein expressly incorporated by reference.

This application contains subject matter related to U.S. application Ser. No. 14/990,903, entitled "Clip Connection and Clip Element" filed on Jan. 8, 2016.

BACKGROUND AND SUMMARY OF THE INVENTION

The present invention relates to a fastening claw having an annular section.

In automotive engineering, and also in other technology sectors, there is a trend toward using connection technologies which are as simple as possible in terms of construction and which are as easy as possible to produce in terms of manufacturing. In this context, reference is made for example to DE 10 2008 038 747 A1, DE 10 2009 049 602 B3, DE 10 2010 028 322 A1, DE 10 2010 028 323 A1, DE 10 2010 030 964 A1, WO 2012 031 652 A1, DE 10 2010 041 356 A1, DE 10 2010 042 803 A1, DE 10 2010 063 717 A1, DE 10 2011 080 317 A1 or DE 10 2012 206 938 B3.

It is an object of the invention to provide a fastening element which is of simple construction and which is inexpensive, and by means of which high-strength component connections can be produced in a simple manner and with low assembly forces. A further object of the invention consists in providing a component connection having a fastening element of this type.

This and other objects are achieved by a fastening claw having a circular ring-shaped section which has a radial inner side from which at least two resiliently elastic tongue-like elements project obliquely inwardly and upwardly in the direction of a top side of the fastening claw. The tongue-like elements have free ends which define a central, open region of the fastening claw, into which, from the direction of an underside of the fastening claw, a fixing element can be inserted and clamped between the free ends of the tongue-like elements.

The basic principle of the invention thus consists in a "claw-like fastening element" (hereinafter also referred to as "fastening claw") which has a circular (annular) ring-shaped section, from the radial inner side of which at least two, preferably three, four, or more resiliently elastic tongue-like elements project obliquely inward and upward in the direction of a top side of the fastening claw.

The tongue-like elements have free ends. The free ends of the tongue-like elements border or define a central, open region of the fastening claw. From the direction of an underside of the fastening claw, a fixing element can be inserted and clamped between the free ends of the tongue-like elements. The fixing element may be a fixing element which has a spherical or sphere-like head. In principle, fixing elements of some other design, which can be inserted into the central, open region of the fastening claw, are also contemplated.

The above-mentioned tongue-like elements are separated from one another by slots which extend substantially radially inward from a region situated close to the circular ring-shaped section. It may be provided that radially outer ends of the slots provided between the tongue-like elements are rounded.

It may also be provided that the tongue-like elements taper toward their free ends. The free ends of the tongue-like elements may for example be of convexly rounded form. As an alternative to this, the free ends of the tongue-like elements may also be of straight form such that they extend "tangentially" with respect to the central, open region of the fastening claw. As an alternative to this, it may be provided that the free ends of the tongue-like elements are of concave form. A concave design of the free ends of the tongue-like elements has the advantage that, if the fixing element clamped between them is of rounded form, said free ends can bear closely against the outer contour of the fixing element.

In one refinement of the invention, the tongue-like elements project obliquely from the circular ring-shaped section. "Obliquely" means that the tongue-like elements each enclose a particular angle with the plane formed by the circular ring-shaped section. Tests have shown that it is advantageous if the angle lies in a range between 10° and 40°. Angles which lie in a range between 20° and 30° are particularly expedient. In a specific exemplary embodiment, it may, for example, be provided that the angle that the tongue-like elements enclose with the circular ring-shaped section is 28° or greater.

In one refinement of the invention, the tongue-like elements are arranged so as to be distributed uniformly in the circumferential direction of the circular section. The tongue-like elements may, in particular, be of identical form. As already mentioned, at least two tongue-like elements are provided. From a strength aspect, it is expedient for precisely three or precisely four tongue-like elements to be provided. In principle, it would, however, also be possible for five or more such tongue-like elements to be provided.

The fastening claw may be produced from metal, in particular from a metal sheet. The fastening claw may for example be punched out of a steel sheet, wherein, after the punching-out process, the tongue-like elements are bent-up as described above.

In one refinement, multiple "shield ring sections" project radially outward from the circular ring-shaped section, which shield ring sections are arranged so as to be distributed in the circumferential direction of the circular ring-shaped section. Two successive shield ring sections in the circumferential direction are in this case separated from one another by a shield ring slot which extends in a radial direction. The shield ring sections impart additional elasticity to the fastening claw. The shield ring sections have a similar function to leaf springs or plate springs, that is to say, in the assembled state, they press the fastening claw against a component.

Radially inner ends of the shield ring slots may be rounded.

In one refinement of the invention, it is provided that the shield ring slots are offset in the circumferential direction in relation to the slots provided between the tongue-like elements.

The shield ring sections preferably project obliquely downward from the circular ring-shaped section, giving rise to a "hat-shaped form" of the fastening claw.

It may be provided that the number of shield ring sections is equal to or greater than the number of tongue-like elements.

If the fastening claw is produced from steel, it is advantageous for it to be case-hardened. Furthermore, it may be provided that the fastening claw is covered with a coating material, for example with a corrosion prevention coating and/or with an electrically insulating coating.

As an alternative to metal, the fastening claw may, for example, also be produced from plastic. It is essential that the fastening claw exhibits a certain minimum degree of elasticity.

In one refinement of the invention, it is provided that the fastening claw is an independent connecting element and is not an integral constituent of any other part or of any other component. The latter situation is, however, in no way ruled out. The fastening claw itself may self-evidently also be an integral constituent of some other part or of some other component, or may be connected to some other part or to some other component.

A further aspect of the invention is a component connection having a fastening claw as has been described above. A component connection of this type has a first component with a male fixing element which projects from the first component. The male fixing element may be subdivided into a first section and into a second section which is connected to the first section or which adjoins the first section. Via the first section, the male fixing element is connected directly to the first component. The male fixing element may, for example, by way of the first section, be integrally connected to the first component or welded to the first component or connected in some other way to the first component. According to the invention, the second section, which adjoins the first section, has the shape of a sphere or has a sphere-like shape.

The first section may likewise have the shape of a sphere or may have a sphere-like shape. In this case, the male fixing element is formed by two spheres or sphere-like elements which are connected to one another, for example welded to one another (so-called "double sphere").

This however need not imperatively be the case. The first section could for example also be of peg-like or cylindrical or similar form. The second spherical or sphere-like section preferably projects in the manner of a head from the first section.

The fastening claw is clipped onto the male fixing element, in particular to the spherical or sphere-like second section thereof, specifically in such a way that the free ends of the tongue-like elements bear obliquely from below against the spherical or sphere-like section in a region between a top side of the first component and an equatorial plane of the spherical or sphere-like section. This contact position below the equatorial plane gives rise to a positively locking action or an undercut, which has the effect that, in principle, the fastening claw can be detached from the male fixing element only by being destroyed, or by means of a suitably designed special tool.

In one refinement of the invention, it is provided that the component connection has a second component which, in turn, has a passage hole through which the male fixing element extends.

It may be provided that at least the circular ring-shaped section and/or the shield ring sections bear(s) (resiliently) against the second component in a region of the second component which is situated close to the passage hole and at a side of the second component which faces away from the first component. The circular ring-shaped section and/or the shield ring sections thus oppose(s) a detachment of the second component from the first component. Owing to the shape of the fastening claw, a detachment force acting on the second component is converted into forces which act in a longitudinal direction of the tongue-like elements, said forces being supported, at the free ends of the tongue-like elements, by the second, spherical or sphere-like section of the male fixing element. This gives rise to a self-locking action which opposes the detachment force.

The component connection according to the invention may be used in a multiplicity of technology sectors. Numerous uses are contemplated, for example, in automotive engineering, in particular in the vehicle body construction sector. Accordingly, the first and/or the second component may, for example, be a first and/or a second vehicle body part.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
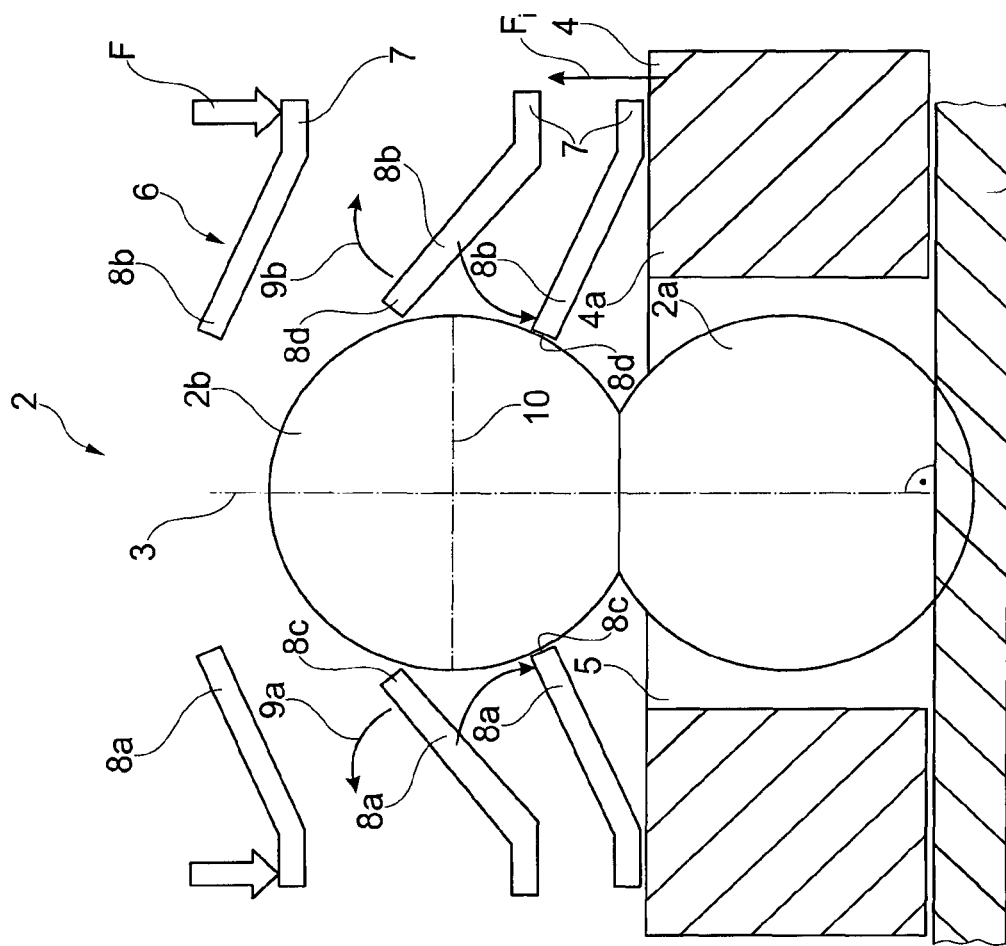
FIG. 1 shows the basic principle of the invention in a schematic illustration.

FIG. 1 is a schematic illustration of the basic principle of the invention. A "male fixing element" 2 has been welded onto a first component 1, which may, for example, be a (steel) sheet (for example a body part of a vehicle body). The male fixing element 2 is in this case formed by two spheres 2a, 2b that have been welded together. The sphere 2a has been welded onto the top side of the component 1. A straight line 3 running through both the central points of the spheres 2a, 2b is perpendicular to the component 1 at the contact point of the sphere 2a.

A second component 4 has been mounted onto the first component 1. The second component 4 has a passage hole 5, the diameter of which is larger than the diameter of the two spheres 2a, 2b of the male fixing element 2. The male fixing element 2 projects through the passage hole 5, wherein the sphere 2b is situated entirely on the top side 4a, facing away from the component 1, of the second component 4.

The two components 1, 4 are clamped together by way of the male fixing element, which is in this case in the form of a "double sphere", and a fastening claw 6. The fastening claw, which is merely schematically illustrated in FIG. 1, has a substantially planar circular ring-shaped section 7 and has two resiliently elastic tongue-like elements 8a, 8b.

FIG. 1 illustrates the fastening claw 6 in three different positions, specifically—starting from the top—in an initial position, in a central position and in a joined position.

Proceeding from the initial position, the fastening claw 6 is pressed against the ball 2b with a force F, which has the effect that the tongue-like elements 8a, 8b bend elastically upward, as indicated by the arrows 9a, 9b. Free ends 8c, 8d of the tongue-like elements 8a, 8b slide downward on the outer circumference of the sphere 2b, across the equatorial plane 10 thereof.

When the fastening claw 6 lies with its circular ring-shaped section 7 on the top side 4a of the second component 4, the tongue-like elements 8a, 8b project obliquely upward from the circular ring-shaped section 7, wherein the free ends 8c, 8d of the tongue-like elements 8a, 8b bear against the outer circumference of the sphere 2b obliquely from below in a region between the top side 4a of the second component 4 and the equatorial plane 10 of the sphere 2b. This gives rise to a positively locking action.

A detachment of the second component 4 from the first component 1 is blocked by the fastening claw 6, as indicated by the force F1. The detachment force F1 is transmitted via the circular ring-shaped section 7 to the fastening claw and is introduced via the tongue-like elements 8a, 8b, in the longitudinal direction of the tongue-like elements 8a, 8b and via the free ends 8c, 8d thereof, into the sphere 2b of the male fixing element 2 and is supported by the latter. Since the tongue-like elements 8a, 8b automatically do not bend upward, a detachment of the second component 4 from the first component 1 is prevented.

Figure 2:
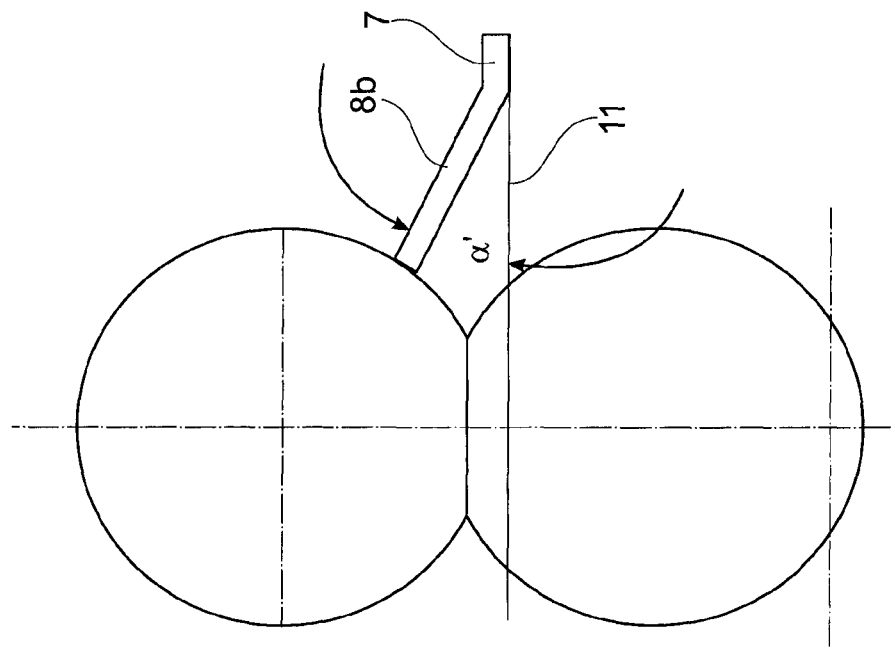
FIG. 2 shows the designation of the angle of inclination of the tongue-like elements.

Tests have shown that it is expedient if as illustrated in FIG. 2, the angle α between the plane 11 formed by the circular ring-shaped section 7 and the tongue-like elements (only the tongue-like element 8b is illustrated in FIG. 2) lies in a range between 10° and 40°, preferably in a range between 20° and 30°. In the exemplary embodiment shown in FIG. 2, the angle α is approximately 25°.

Figure 3:
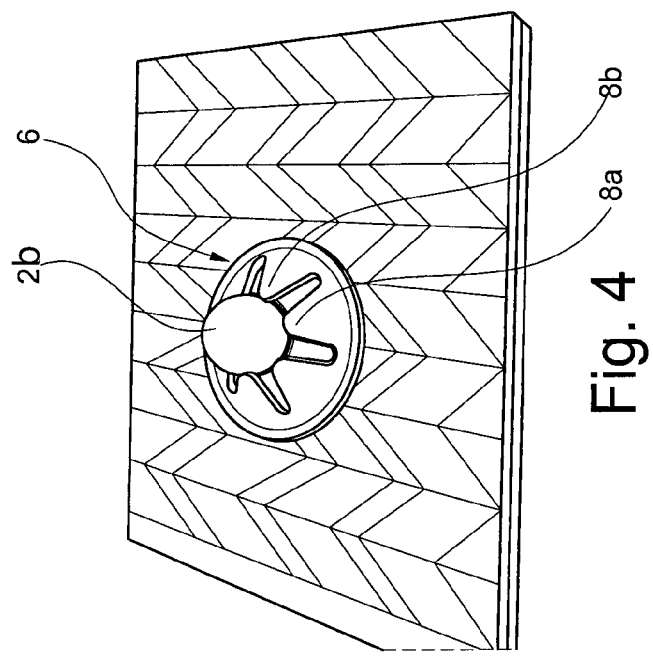
FIG. 3 shows a second component with a passage hole through which a double sphere projects.

FIG. 3 shows a part of the arrangement according to an embodiment of the invention, wherein a component 4 which has a hole 5 has been mounted onto a component 1 such that a "double sphere" (corresponds to the male fixing element 2), which projects from the component 1 via sphere 2a, projects by way of its upper sphere 2b through the hole 5.

Figure 4:
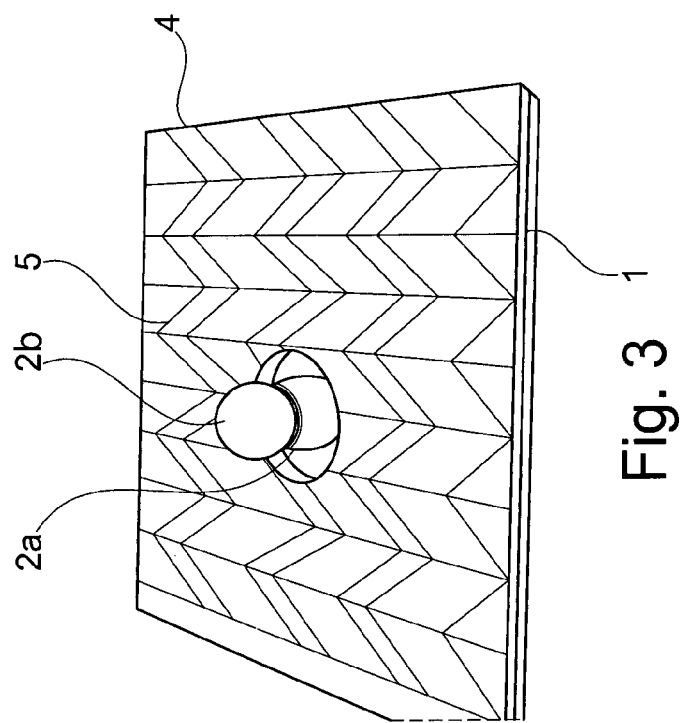
FIG. 4 shows the exemplary embodiment of FIG. 3 with a fastening claw clipped thereon.

FIG. 4 shows the "finished" component connection, with a fastening claw 6, which has multiple tongue-like elements 8a, 8b arranged distributed in the circumferential direction, having been clipped onto the sphere 2b.

Figure 5:
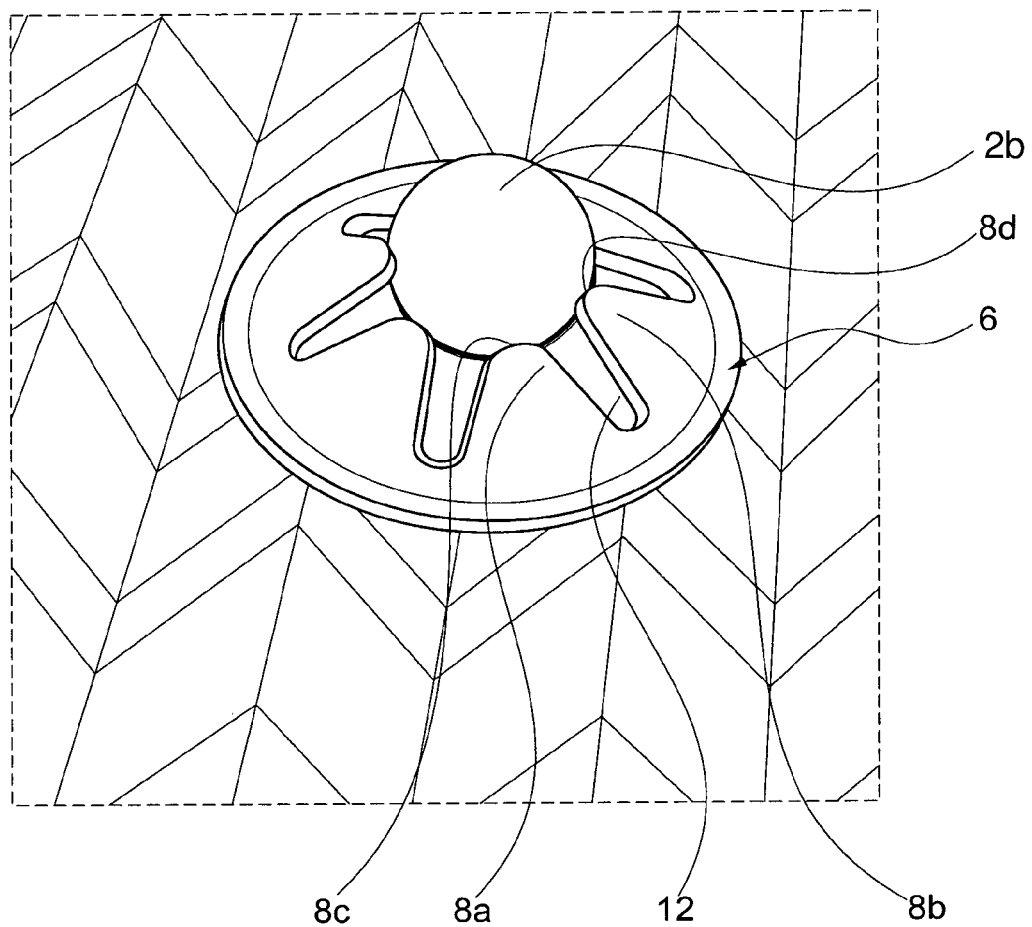
FIG. 5 is an enlarged illustration of a component connection according to an embodiment of the invention.

FIG. 5 is an enlarged illustration of a component connection of this type. It can be clearly seen that the tongue-like elements 8a, 8b taper toward their free ends 8c, 8d. The individual tongue-like elements 8a, 8b are in each case separated from one another by radially inwardly extending slots 12. As can be seen from FIG. 5, radially outer ends of the slots 12 provided between the tongue-like elements 8a, 8b are rounded.

In the exemplary embodiment shown in FIG. 5, the free ends 8c, 8d of the tongue-like elements 8a, 8b are of substantially straight form, that is to say they bear tangentially against the sphere 2b. As an alternative to this, the free ends could also be of convexly rounded or concavely rounded form. Concavely rounded free ends have the advantage that they would bear closely against the outer circumference of the sphere 2b.

Figure 6:
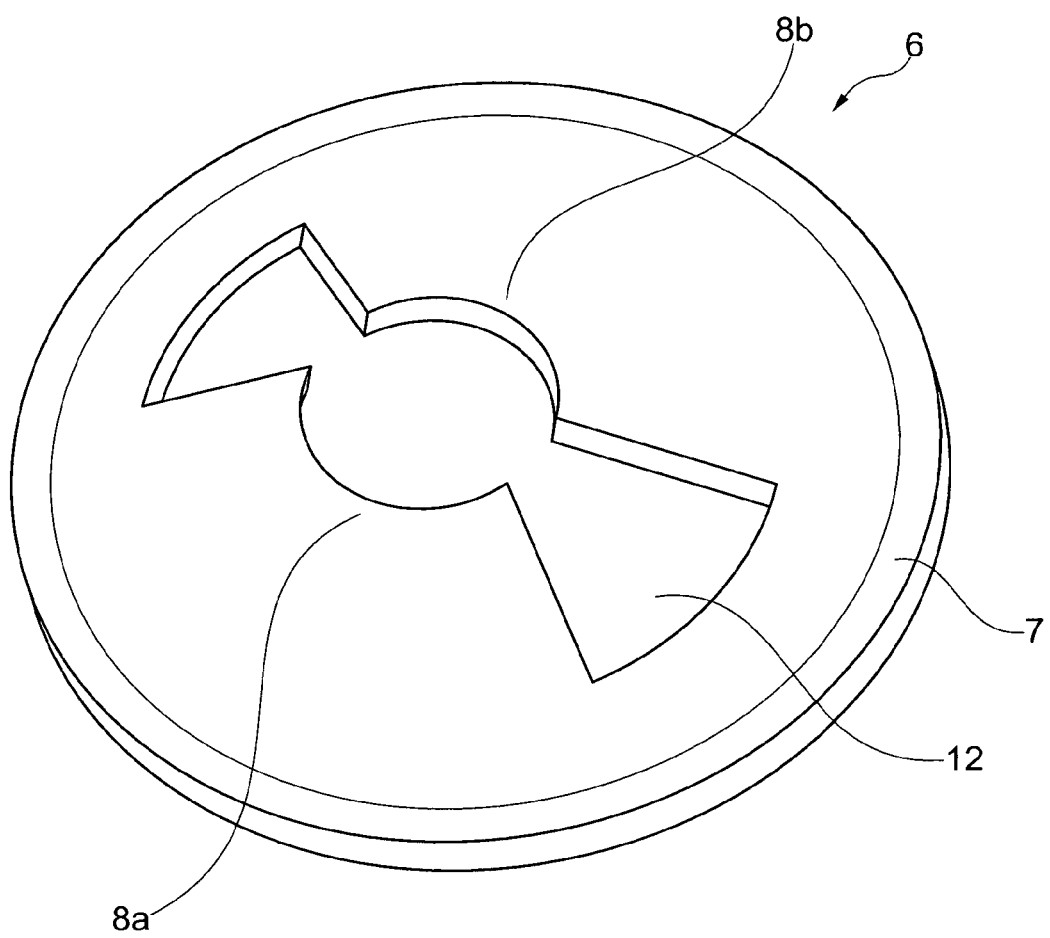
FIG. 6 shows an alternative exemplary embodiment of a fastening claw with two spring elements.

FIG. 6 shows an exemplary embodiment of a fastening claw which has only two tongue-like elements 8a, 8b, the free ends of which are concavely rounded. The slots 12 which separate the two tongue-like elements 8a, 8b from one another are in this case of trapezoidal form.

Figure 7:
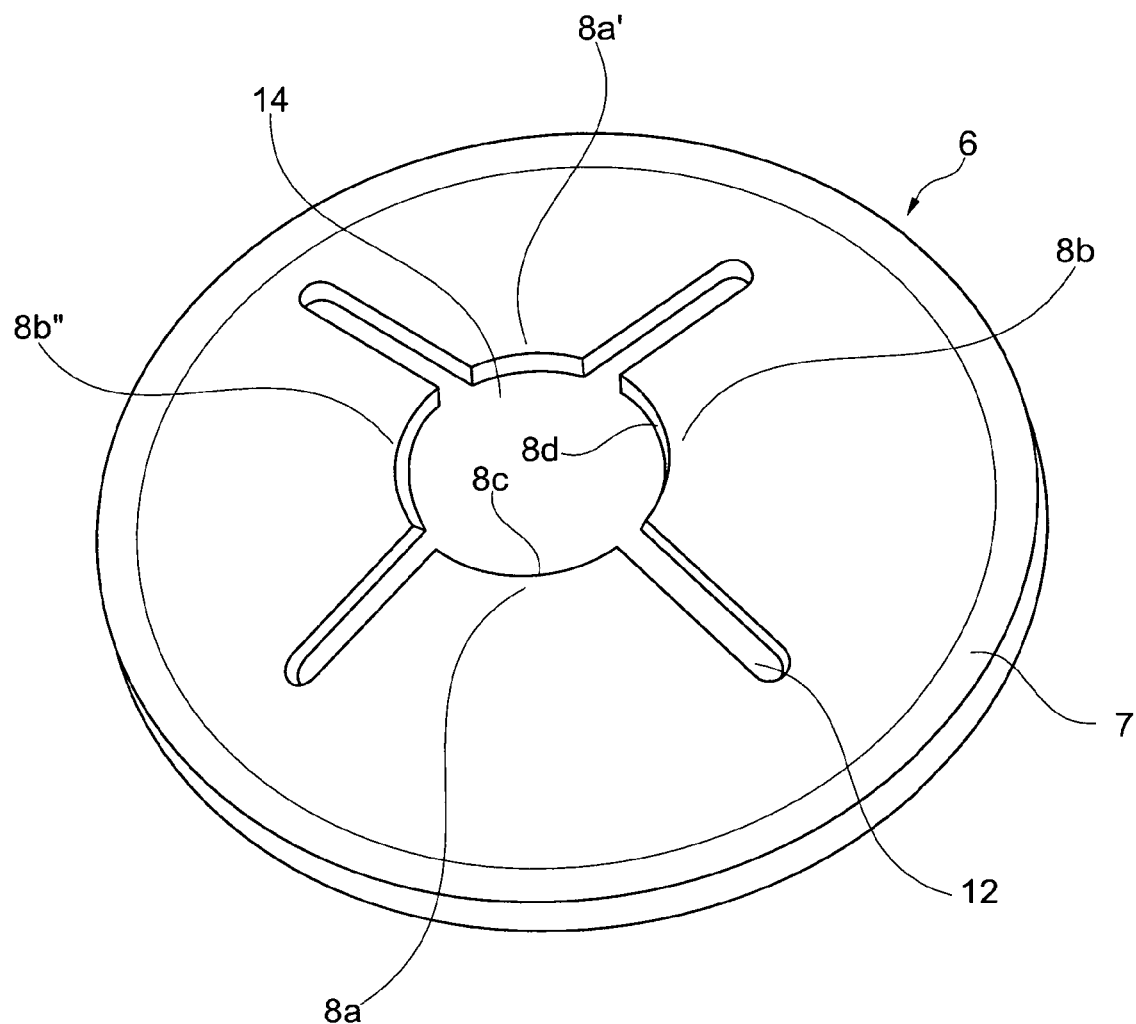
FIG. 7 shows an alternative exemplary embodiment of a fastening claw with four spring elements.

FIG. 7 shows an exemplary embodiment of a fastening claw 6 which has four tongue-like elements 8a, 8b, 8a', 8b'. Two successive tongue-like elements 8a, 8b in the circumferential direction are separated from one another in each case by a narrow slot 12 which extends in the radial direction and which is rounded at its base. In this exemplary embodiment, too, the free ends 8c, 8d of the tongue-like elements 8a, 8b are concavely rounded.

Figure 8:
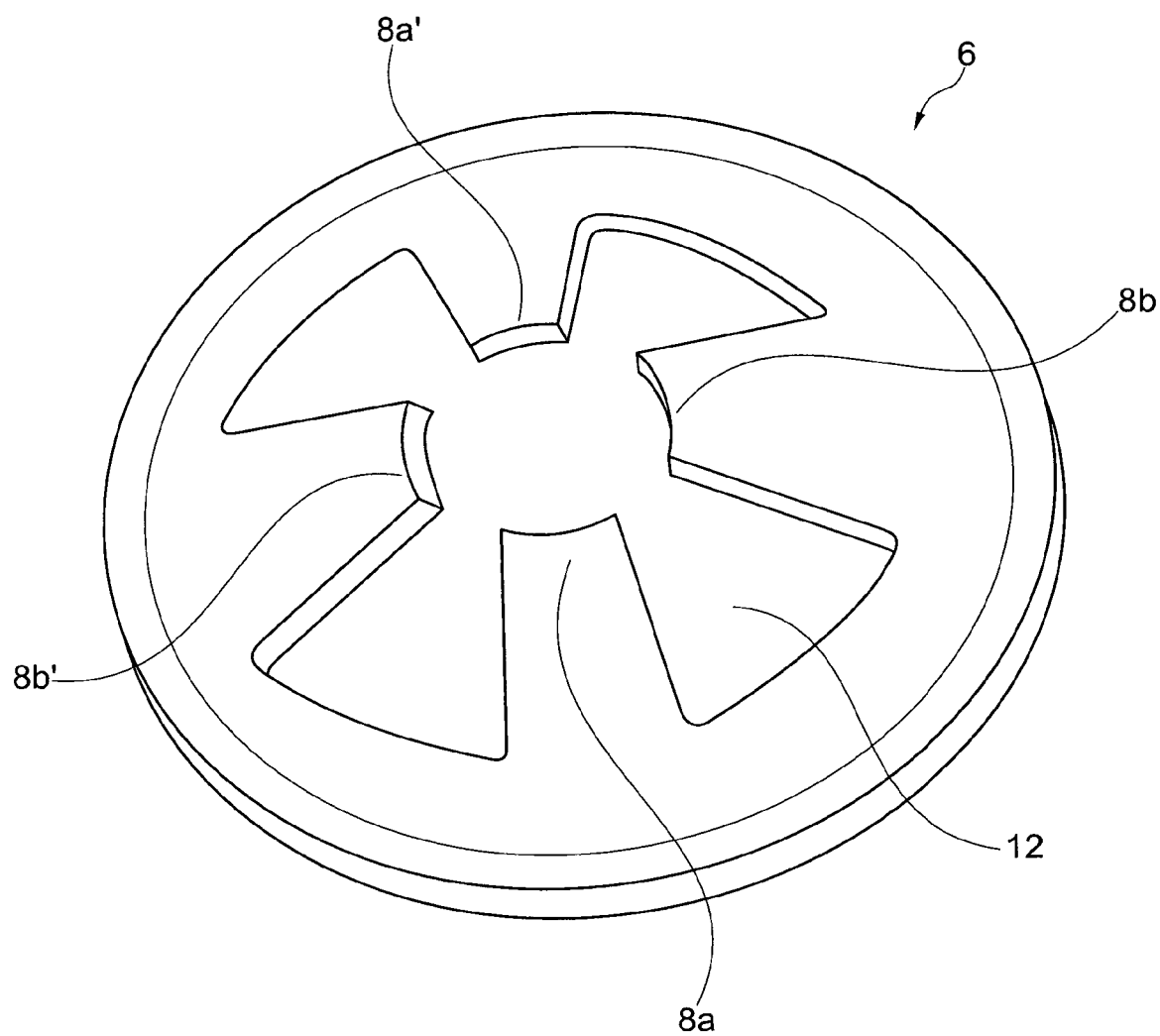
FIG. 8 shows an alternative exemplary embodiment of a fastening claw with four spring elements.

FIG. 8 shows an exemplary embodiment of a fastening claw 6, in which it is likewise the case that four tongue-like elements 8a, 8b, 8a', 8b' are provided. By contrast to the exemplary embodiment of FIG. 7, it is the case here that the slots 12 are of trapezoidal form, similarly to the exemplary embodiment of FIG. 6.

Figure 9:
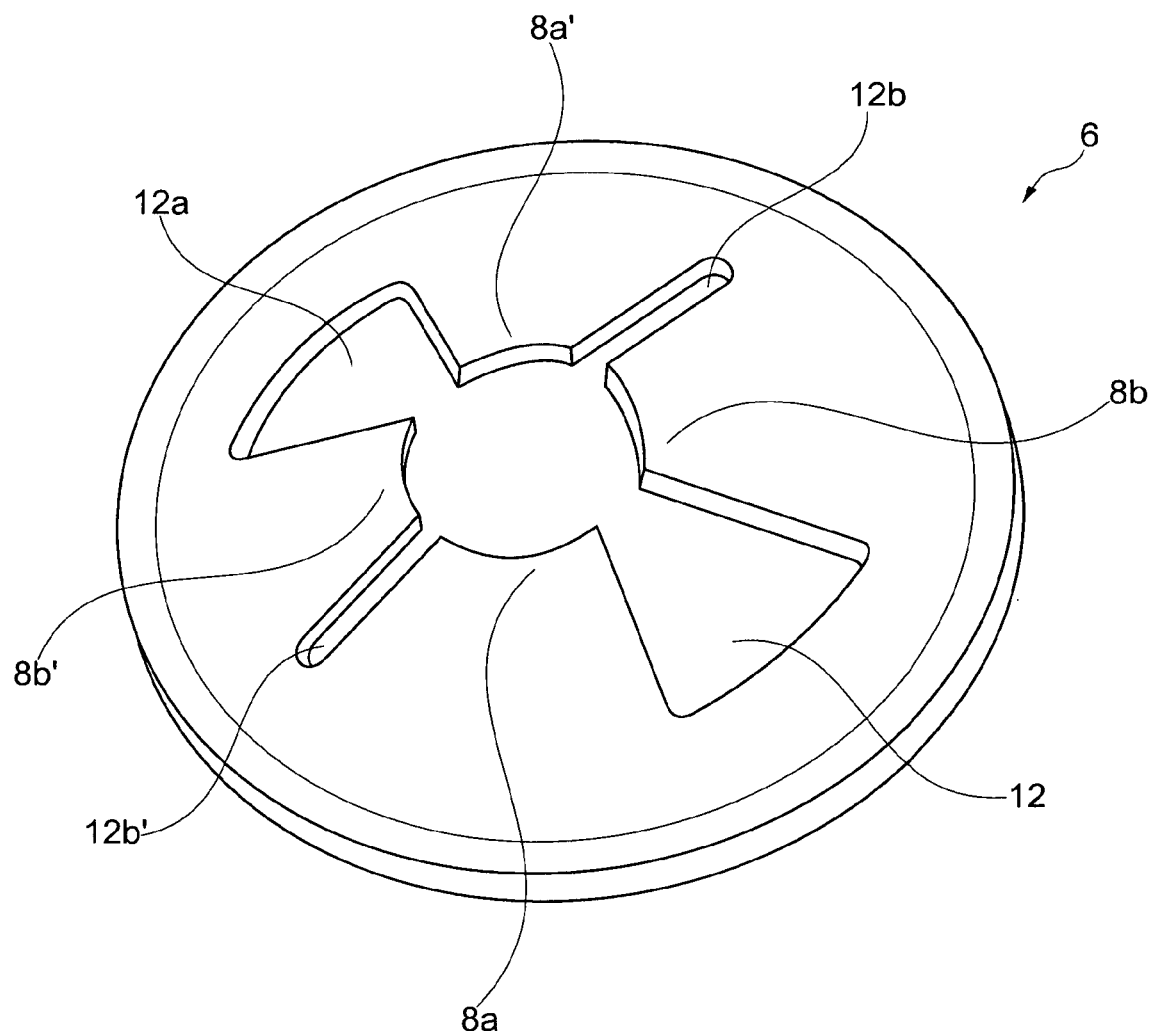
FIG. 9 shows a further alternative exemplary embodiment of a fastening claw with four spring elements.

FIG. 9 shows an exemplary embodiment of a fastening claw 6 in which four tongue-like elements 8a, 8b, 8a', 8b' are provided. The slot 12 which separates the two tongue-like elements 8a, 8b, and the opposite slot 12a, are of trapezoidal form, whereas the two other slots 12b, 12b' are formed as relatively narrow, straight slots running in the radial direction.

Figure 10:
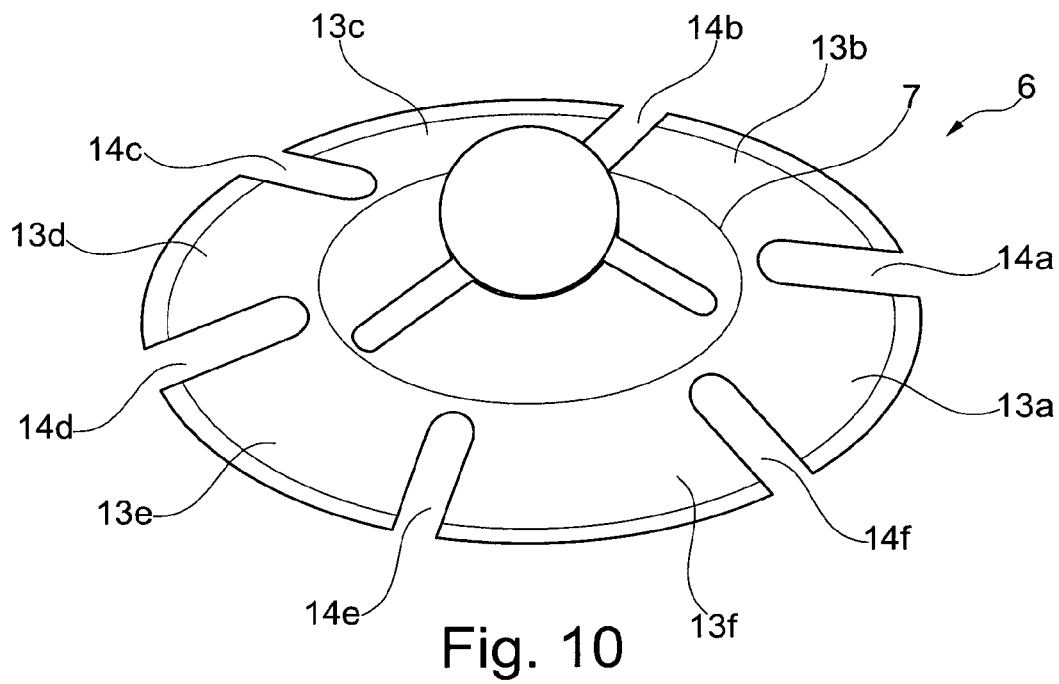
FIG. 10 shows a further alternative exemplary embodiment of a fastening claw with additional shield ring sections.

FIG. 10 shows an exemplary embodiment of a fastening claw 6 which has multiple shield ring sections 13a, 13b, 13c, 13d, 13e, 13f which project, in the circumferential direction of the circular ring-shaped section 7, radially obliquely outward from the circular ring-shaped section, wherein successive shield rings sections in the circumferential direction are in each case separated from one another by a shield ring slot 14a-14f extending substantially in the radial direction. As already indicated, it may be provided that the shield ring sections 13a-13f do not lie in the same plane as the circular ring-shaped section 7, but project obliquely downward from the latter. The shield ring sections and the tongue-like elements, or the fastening claw 6 as a whole, exhibit(s) a certain degree of flexural elasticity.

Figure 11:
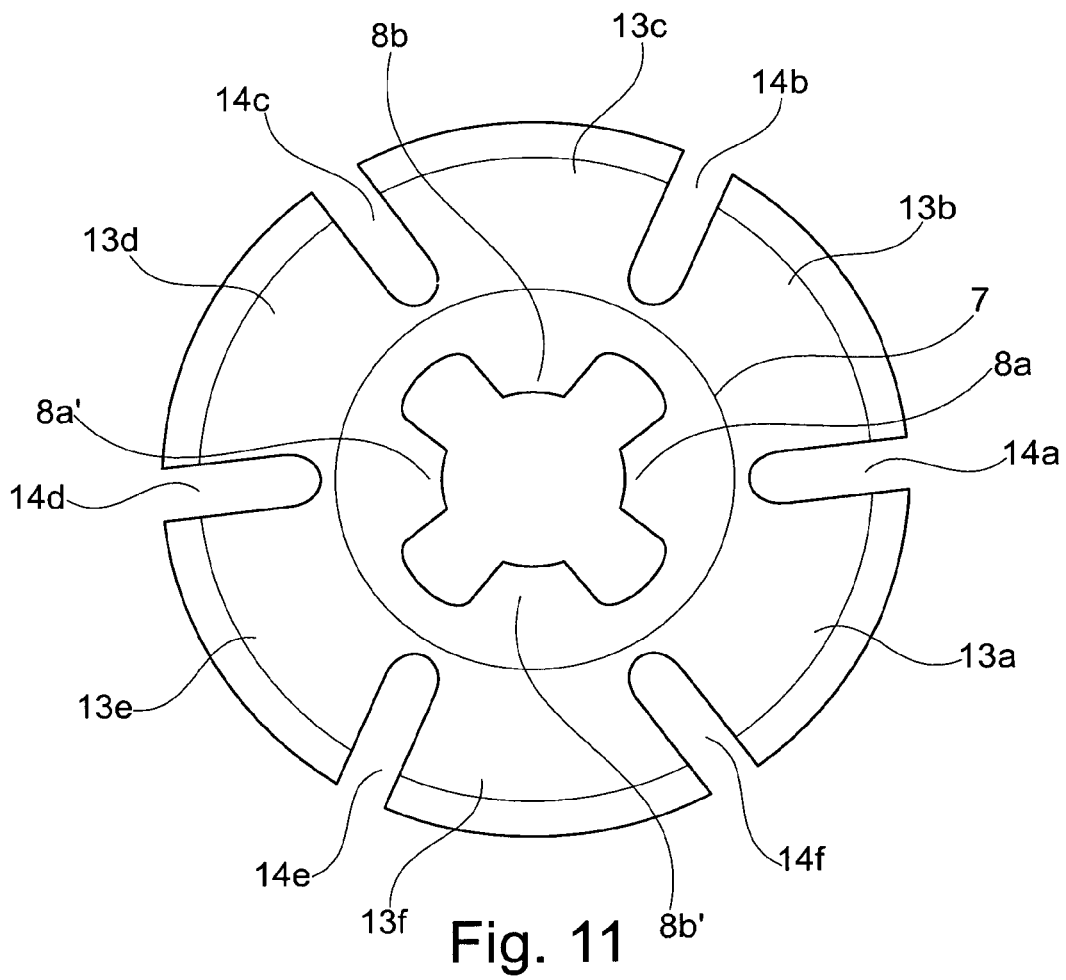
FIG. 11 shows a variant of the exemplary embodiment of FIG. 11.

FIG. 11 shows a similar exemplary embodiment in which it is likewise the case that shield ring sections 13a-13f project radially outward from the circular ring-shaped section 7. Altogether, six shield ring sections 13a-13f are provided, whereas only four tongue-like elements 8a, 8b, 8a', 8b' are provided.

Figure 12:
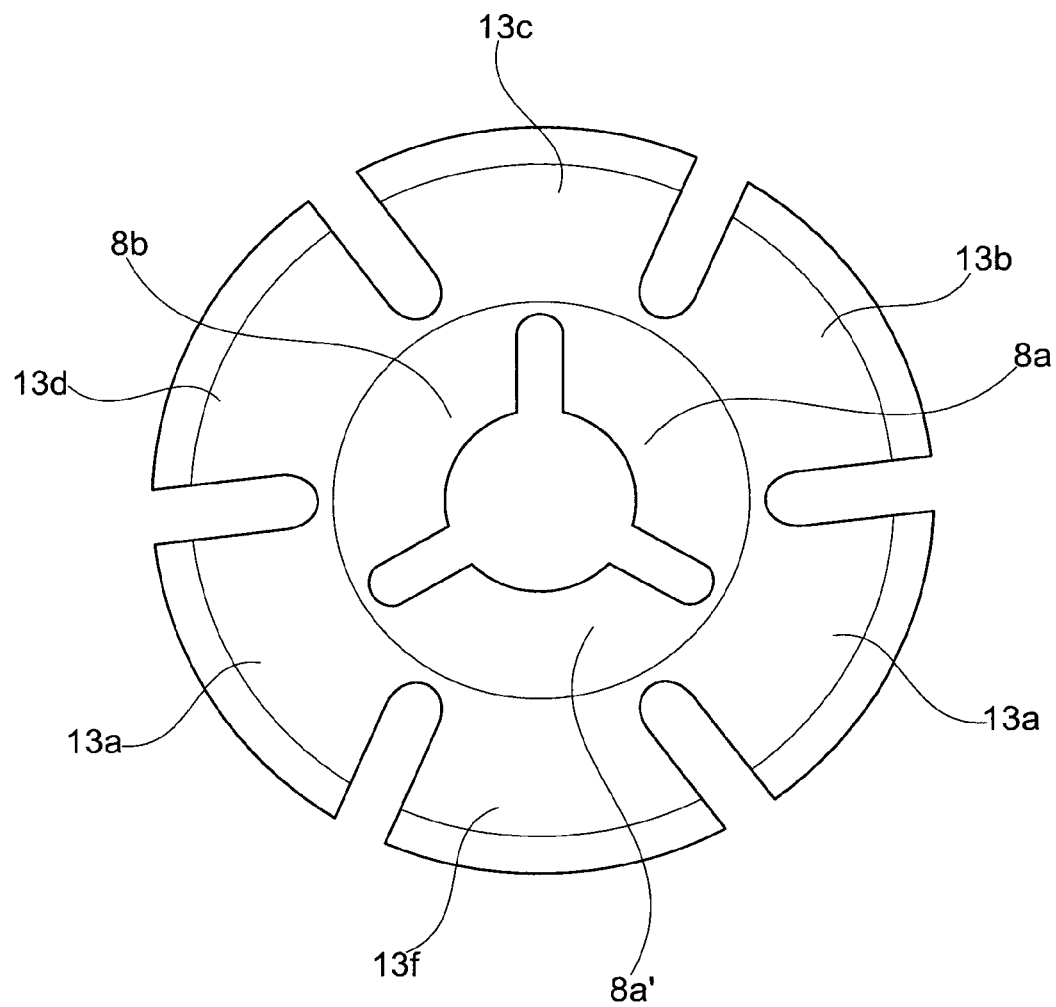
FIG. 12 shows a further variant of a fastening claw.

FIG. 12 shows an exemplary embodiment in which six shield ring-like elements 13a-13f but only three tongue-like elements 8a, 8b, 8a' are provided.

For the sake of completeness, it is also mentioned that the free ends 8c, 8d (cf for example FIG. 7) border or define a central, open region 14 of the fastening claw 6, into which, from the direction of an underside of the fastening claw 6, the male fixing element 2 (shown for example in FIG. 5) is inserted by way of its ball 2b and can be clamped between the free ends of the tongue-like elements 8a, 8b, 8a', 8b'.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A component connection, comprising:
a first component;
a male fixing element projecting from the first component, the male fixing element having a first spherical section connected directly to the first component and a second spherical section connected to directly the first spherical section; and a fastening claw comprising
- a circular ring-shaped section having a radial inner side; and
- at least two resiliently elastic tongue elements projecting from the radial inner side inwardly and upwardly in a direction of a top side of the fastening claw, wherein
  - the tongue elements have free ends that define a central open region of the fastening claw into which, from a direction of an underside of the fastening claw, the male fixing element is insertable,
  - the tongue elements are configured to clamp the mate fixing element between the free ends, and
  - the fastening claw is clipped onto the male fixing element such that the free ends of the tongue elements bear obliquely from below and externally against the second spherical section of the male fixing element in a region between a top side of the first component and an equatorial plane of the second spherical section.

2. The component connection according to claim 1, wherein the tongue elements are separated from one another by slots which extend substantially radially inward from a region spaced apart from the radial inner side of the circular ring-shaped section.

3. The component connection according to claim 2, wherein radially outer ends of the slots provided between the tongue elements are rounded.

4. The component connection according to claim 1, wherein the tongue elements taper toward their free ends.

5. The component connection according to claim 4, wherein the free ends are rounded.

6. The component connection according to claim 4, wherein the free ends are of straight form and extend tangentially with respect to the central open region of the fastening claw.

7. The component connection according to claim 4, wherein the free ends are of concave form, such that they can bear closely against a fixing element of rounded form.

8. The component connection according to claim 1, wherein the tongue elements project at an angle from a plane formed by the circular ring-shaped section, said angle lying in a range between 10° and 40°.

9. The component connection according to claim 8, wherein the angle lies in a range between 20° and 30°.

10. The component connection according to claim 8, wherein the angle is greater than 28°.

11. The component connection according to claim 1, wherein the tongue elements are arranged so as to be distributed uniformly in a circumferential direction of the circular ring-shaped section.

12. The component connection according to claim 1, wherein the tongue elements are of identical form.

13. The component connection according to claim 1, wherein only two tongue elements are provided.

14. The component connection according to claim 1, wherein only three tongue elements are provided.

15. The component connection according to claim 1, wherein only four tongue elements are provided.

16. The component connection according to claim 1, wherein the fastening claw is made of metal.

17. The component connection according to claim 1, wherein the circular ring-shaped section is planar.

18. The component connection according to claim 1, further comprising:
multiple shield ring sections that project radially outward from the circular ring-shaped section, wherein the shield ring sections are arranged so as to be distributed in the circumferential direction of the circular ring-shaped section.

19. The component connection according to claim 18, wherein two successive shield ring sections in the circumferential direction are separated from one another in each case by a shield ring slot which extends in a radial direction.

20. The component connection according to claim 19, wherein radially inner ends of the shield ring slots are rounded.

21. The component connection according to claim 19, wherein the shield ring slots are offset in the circumferential direction in relation to slots provided between the tongue elements.

22. The component connection according to claim 18, wherein the shield ring sections project obliquely downward from the circular ring-shaped section.

23. The component connection according to claim 18, wherein the number of shield ring sections is equal to or greater than the number of tongue elements.

24. The component connection according to claim 1, wherein the fastening claw is a metal sheet punched part, wherein the tongue elements have been bent up.

25. The component connection according to claim 1, wherein the fastening claw is a case-hardened part.

26. The component connection according to claim 1, further comprising:
a coating material lining the fastening claw.

27. The component connection according to claim 1, further comprising a corrosion prevention coating lining the fastening claw.

28. The component connection according to claim 1, further comprising an electrically insulating coating lining the fastening claw.

29. The component connection according to claim 1, wherein the fastening claw is made of plastic.

30. The component connection according to claim 1, wherein the fastening claw is an independent component and is not an integral constituent of any other part or of any other component.

31. The component connection according to claim 1, further comprising:
- a second component having a passage hole, wherein the male fixing element extends through the passage hole, and
- wherein the fastening claw is arranged between a top surface of a second component and the equatorial plane of the spherical section.

32. The component connection according to claim 31, wherein:
- the ring-shaped section and/or shield ring sections that project radially outward from the ring-shaped section bear against the top side of the second component in a region near the passage hole and oppose a detachment of the second component from the first component, and
- a detachment force acting on the second component is converted into forces acting in a longitudinal direction of the tongue elements, said forces being supported by the second spherical section of the male fixing element to provide a self-locking action opposing the attachment force.

33. The component connection according to claim 1, wherein the first section of the male fixing element is a spherical section, in which case the male fixing element comprises two spherical sections welded to one another.

34. The component connection according to claim 33, wherein the male fixing element is made of metal.

35. The component connection according to claim 1, wherein the first section of the male fixing element is welded directly to the first component.

* * * * *